Sept. 17, 1963 W. BRADLEY, JR ETAL 3,104,334
ANNULAR ACCELEROMETER
Filed Sept. 15, 1959
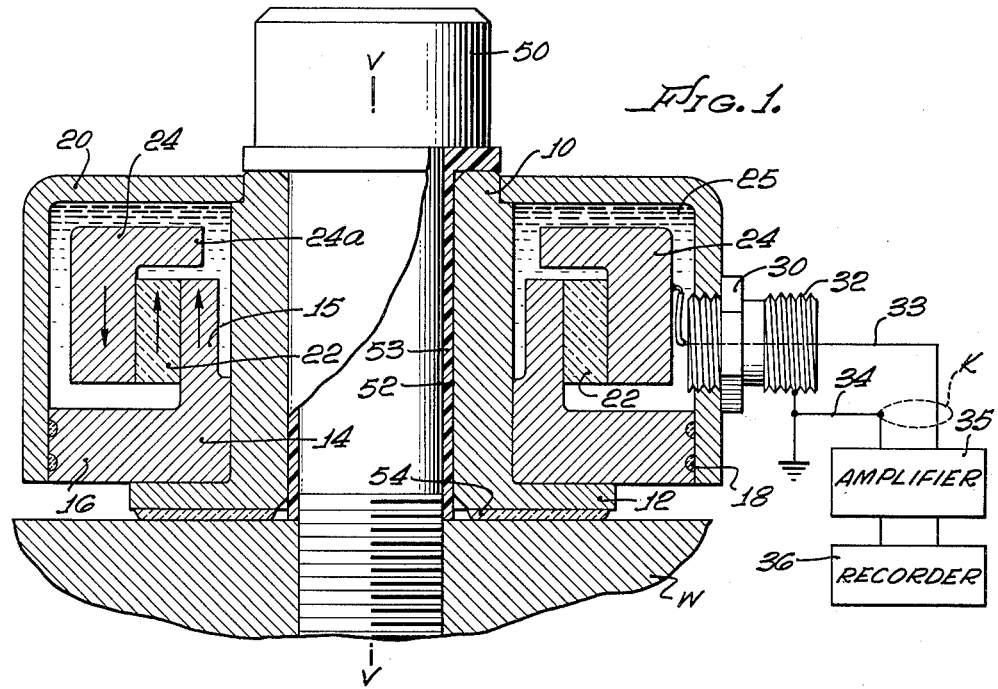
INVENTORS
WILSON BRADLEY, JR.
GUNNAR B. BERGMAN
BY
ATTORNEY.

United States Patent Office 3,104,334
Patented Sept. 17, 1963

3,104,334
ANNULAR ACCELEROMETER
Wilson Bradley, Jr., and Gunnar B. Bergman, Pasadena, Calif., assignors to Endevco Corporation, Pasadena, Calif., a corporation of California
Filed Sept. 15, 1959, Ser. No. 840,089
14 Claims. (Cl. 310—8.4)

This invention relates to accelerometers and particularly to accelerometers employing piezoelectric material for generating electrical signals in accordance with accelerations to be detected.

In an accelerometer of the type to which this invention applies, an annular piezoelectric sensing element is mounted in a cylindrical case or housing with one face of the sensing element in contact with a wall of the housing, and another face in contact with an annular inertial member or mass. The piezoelectric element is connected to an electric circuit for detecting, indicating, or recording electrical signals generated by the piezoelectric element in response to accelerations of the case or housing in a direction parallel to its central axis when it is mounted upon a vibrating object. The polarization axis is parallel to the central axis of the crystal element.

Inasmuch as we have discovered that by polarizing the piezoelectric element and disposing its axis of polarization parallel to the axis of vibration of the vibrating object and by mounting the piezoelectric element in shear relationship between the case or housing and the inertial member, the output from the accelerometer is substantially equal to the output of an accelerometer using piezoelectric materials under compression. However, with this arrangement very low cross-axis sensitivity can be attained and the resonance characteristic of the system is little affected by the resonant characteristics of the case.

It is therefore a principal object of this invention to provide an improved accelerometer in which piezoelectric materials are mounted in shear relationship between a housing or body member to be vibrated with the object or apparatus being tested and an inertial or mass member, whereby to produce electrical output generated by the shear effects.

A further object of the invention is to provide an accelerometer wherein side acceleration effects are substantially eliminated and to accomplish such result by the mounting of the polarized piezoelectric material in shear relationship between an inertial member and the vibrating body member, a very low cross-axis sensitivity being thereby obtained.

Another object is to provide an accelerometer having an extremely high natural frequency that is determined only by shear constants.

A further object of the invention is to provide an accelerometer in which piezoelectric material is employed that is mounted in shear relationship between an inertial member and a vibratable body wherein such accelerometer body is mountable in insulated relation upon the structure to be tested and whereby to reduce spurious signal phenomena due to ground loops.

It is an incidental object to provide a housing or casing for such an accelerometer with a hole or holes making it possible to mount the accelerometer on the instrument to be tested through the employment of a screw or screws which may themselves be insulated to reduce spurious signal phenomena.

A still further object of the invention, and an important object thereof, is to provide for increase of the charge sensitivity of such an accelerometer by employing multiple concentric tubular sections or rings secured or cemented together to form the annular piezoelectric element in the form of a unitary annular member which is mounted in shear relationship between the inertial mass and the body member or housing.

Other features of the invention, and various other objects thereof, will become apparent to those skilled in this art upon reference to the following specification and the accompanying drawing wherein certain embodiments of the invention are disclosed.

In the drawing:

FIGURE 1 is a schematic diagram showing a vertical transverse section of an accelerometer carrying an annular piezoelectric member mounted in shear relationship between the housing and an inertial member or mass suspended from the housing by such annular piezoelectric member and also showing an amplifier and recorder to be associated with the accelerometer;

FIG. 2 is a sectional fragment illustrating a sectional annular piezoelectric member wherein various concentric sections thereof are arranged with the polarization axes of adjacent sections disposed in opposite directions;

FIG. 3 is a perspective view indicating a structure in the form of a three-axis unit which may be screwed into apparatus to be tested and in any appropriate position; and FIG. 4 is a vertical section as indicated by the line 4—4 of FIG. 3.

In the accelerometer illustrated in FIG. 1, use is made of piezoelectric sensitivity in the shear mode to produce an electrical output in an accelerometer substantially equal to that obtained when employing the piezoelectric crystal materials under compression. The charge sensitivity may be increased by the use of multiple adjacent oppositely polarized annular piezoelectric crystal sections, especially where their polarization axes are oppositely directed, as illustrated in FIG. 2, wherein the directions of polarization are indicated by respective arrows. In both of these constructions, the annular piezoelectric crystal elements are disposed in shear along axes parallel to the polarization axes and to the axis of vibration of the body member or housing of the accelerometer. Upon vibration, the vibrating force acting on the housing in a direction parallel to the polarization axis causes the inertial member to develop an equal and opposite force, placing the annular piezoelectric crystal elements in shear along the polarization axis. With this shear force, a voltage difference is developed across the two opposite parallel cylindrical surfaces of each piezoelectric crystal element, this voltage difference being directly proportional to said force in both magnitude and sign, and the charge sensitivity increasing as the number of concentric sections of the annular crystal element increases from one in number, as in FIGURE 1, to a greater number such as the three concentric rings of FIG. 2.

Piezoelectric crystal materials for such purposes are well known. One such material is the ceramic barium titanate in crystalline state ($BaTiO_3$). Others are lead metaniobate, cadmium niobate, sodium niobate, a mixture of lead titanate and lead zirconate, and many others, even some natural crystals such as quartz. The first mentioned materials have much higher dielectric constants than quartz, and they also have higher shear and compressive piezoelectric coefficients than quartz. These piezoelectric crystalline materials are readily polarized by known methods for accelerometer use. In such methods the material is subjected to strong electric fields while the material is above its transition temperature. Upon cooling in the electric field, the material develops piezoelectric properties and in particular develops a polarization axis.

With reference particularly to the structure illustrated in FIG. 1, a circular body member 10 having an integral radial outwardly-extending flange 12 is used for mounting the accelerometer directly upon an instrument or piece of work W to be tested. This body member 10 includes and receives in press-fitted relation a circular crystal holder or support 14 which provides an upstanding crystal-receiving sleeve 15 and a radially-outwardly-extending flange or base 16 that rests upon the flange 12 of the body member 10. The periphery of the circular base 16 is adapted to receive in sealed relation, as indicated at 18, the lower edge of an inverted cup-shaped housing member 20.

An annular piezoelectric member 22 such as above described, is snugly fitted over the sleeve 15 and snugly receives an annular inertial member or mass 24 which is flanged at its top to provide an inner ring portion 24a that partially overhangs the sleeve 15. Within the surrounding chamber 25 between the housing 20 and the mass member 24, viscous damping means is provided in the form of a body of oil or other insulating liquid or a body of sponge rubber or the like. The case 20 and mass member 24 are made of metal. The various parts including the case, the piezoelectric element, and the inertial member are concentrically mounted about the vibration sensitive axis V—V.

Connected into an upstanding wall portion of the housing 20 is a cable connector 30 providing a threaded fitting 32 for attachment of a conventional coaxial cable (diagrammatically indicated at K) having a lead 33 extending from the mass member 24 and cooperating with the external member 34 of the coaxial cable to communicate with an amplifier 35 and a recorder 36 which are representative of any desired means to receive and indicate or record effects caused by the vibration or acceleration of the piece of work W or other instrument undergoing test or investigation. By such means indications of electrical output resulting from the shearing of the piezoelectric crystal 22 are obtained in usable form.

A modification of the structure of FIG. 1 is shown in FIG. 2 where the piezoelectric element 22a is constructed as a plurality of concentric piezoelectric crystal sections 40, 41 and 42 which act to increase the charge sensitivity, i.e., the electric output, under given operating conditions. Here, the three concentric elements 40, 41 and 42 are joined together in shear relationship through the medium of intervening electrodes 44 and 45 appropriately secured in place as by suitable electrically-conductive cement. As indicated, the adjacent pairs of piezoelectric elements 40, 41 and 42 are arranged with their polarization axes in opposite direction but parallel with the axis of vibration of the instrument and a common lead 46 is employed to connect the inner electrode 44 and the outer mass member 24 together and to one side of the amplifier 35'. Similarly, another common lead 48 is employed to connect the outer electrode 45 to the sleeve 15 of the support member 14, the body member 10 and the housing 20, and to the mentioned coaxial cable K which includes the lead 46 and extends to the other side of the amplifier 35'. As in FIG. 1, the amplifier 35' is connected to a recorder 36'.

For the purpose of mounting the accelerometer unit of FIG. 1 or FIG. 2 on a piece of work W as indicated in FIG. 1, a screw 50 is employed, this screw 50 extending through a bore 52 at the center of the body member 10. For the purpose of reducing or eliminating spurious ground loop signals, the accelerometer housing, including the body member 10, is insulated from the work W being tested. In the form illustrated, this is accomplished by disposing a flanged insulating sleeve 53 around the screw 50 and by providing the bottom of the body member 10 with a layer of insulation 54 which desirably is a baked layer of ceramic insulation.

FIGS. 3 and 4 illustrate a tri-axial variation of the structure of FIGS. 1 and 2. Here, three piezoelectric accelerometer units 55 are disposed with their vibration sensitive axis parallel respectively to three mutually perpendicular axes X, Y and Z in a single casing or housing. Thus, a first body member 56, which in effect consolidates the body member 10 and the crystal support 15, 16 of FIG. 1, is threaded at 58 into a block-like housing 60 on a horizontal axis, a second body member 56 is threaded on a horizontal axis into another bore in the housing 60 at right angles to the first body member 56, and the third body member 56 is threaded on a vertical axis into a third bore which enters from the top of the housing 60 as the parts are illustrated in FIGS. 3 and 4. With this arrangement, the previously mentioned coaxial cable K may be connected with any one of the body members 56 in accordance with the disposition of the axis of vibration of the instrument being investigated, whereby to connect the respective accelerometer to the amplifier recorder combination 35, 36 above mentioned. Or each accelerometer may be connected to a separate amplifier and recorder by means of a corresponding cable.

As seen in FIG. 4 each body member 56 carries an annular piezoelectric crystal element 62 which is supported in shear relationship between an annular mass member 64 and a crystal holder 65 that is press fitted onto the inner end of the body member 56 as indicated at 66. A lead 68 extends from the mass element 65 through a central bore in the body member 56 and through an integral cable connector 70 threaded at 72 for reception of one end of a coaxial cable that leads to any appropriate amplifier-recorder combination, as previously indicated.

With this three-axis structure of FIGS. 3 and 4, a plurality of concentric piezoelectric crystal elements may be employed, instead of the single annular element 62, in the same way as illustrated in FIG. 2. For the purpose of mounting the housing 60 in insulated relationship upon a piece of work W, whereby to reduce spurious ground loop signals, the bottom of the housing 60 is provided with a layer of insulation 74, like that indicated at 54 in FIG. 1, and insulated screws 50, like those of FIG. 1 are introduced into one or more bore holes 75 to anchor the housing 60 in operative relation with the object undergoing test.

By means of the form of FIG. 1 and FIG. 2 having the single mounting bore 52 and screw 50, such an accelerometer may be secured in any mounting position provided by the work W with a minimum of effort and with a minimum of clearance space. With the structure of FIGS. 3 and 4 the housing 60 may be mounted on the top, for example, of any piece of work and the coaxial cable connected to the appropriate cable connector 70, 72, to lead to the amplifier-recorder combination or other indicating or utilization means to be employed for the particular purpose.

As will be apparent from the foregoing, there are provided by this invention desirable and highly efficient accelerometer combinations employing annular piezoelectric crystal structures which are mounted in shear relationships upon crystal holders in positions between such holders and inertial masses which act, by reason of shear sensitivity, to generate electrical outputs which are directly proportional to the accelerative or vibrational forces imparted by the work W undergoing investigation. Such structures lend themselves fully to complete sealing of the piezoelectric crystalline structures within the respective housings, as well as to their enclosure in suitable damping media. Also, especially with the form of FIGS. 1 and 2, the chamber 25 within the housing 20 may be evacuated so that acoustical pressures on the outer cover cannot be transmitted through any medium within the housing to the crystal sensing element 22, especially in view of the fact that this unit may be completely sealed. This may entail limitations on damping media in the chamber 25. In such a case electrical damping methods are employed. In practice both liquid and electrical damping means are often omitted and the device is employed to detect signals having frequencies that are low compared with its resonant frequency. For example, in one case an accelerometer having a resonant frequency of 30,000 c.p.s. was employed to detect accelerations in the range between 2 c.p.s. to 8000 c.p.s. Also, since the cylinder holding the crystal material and the base therefor may be machined in one piece at one time, very accurate perpendicularities and concentricities can be maintained, whereby to minimize cross-axis sensitivity.

Further, as above indicated with the form of FIGS. 1 and 2, the use of the single central bore 52 with a single screw 50 makes it possible to adjust the accelerometer easily with the coaxial cable K, already attached to the connector thereof, and additionally to avoid the shifting of the rotation of the accelerometer during use. With respect to the three axes of the form of FIG. 3, as above noted their relative positions have been indicated by the three arrows X, Y and Z, the arrow X indicating the horizontal axis of the accelerometer unit at the left of the housing 60, the arrow Y indicating the horizontal axis of the unit at the right side, and the arrow Z indicating the vertical axis of the unit seen at the top of the accelerometer housing 60. Especially with this indication of relationships, it will be appreciated that this structure may be mounted upon any apparatus to be investigated and all three components of the acceleration determined simultaneously regardless of the position of the axis of acceleration by employing three amplifiers and recorders separately connected to each of the three accelerometers respectively.

Although only a limited number of embodiments of the invention have been specifically disclosed and described herein, it will be obvious that the invention is not limited thereto but is capable of being embodied in other forms. Furthermore, the invention is not limited to the measurement of acceleration but may be employed in instruments that measure force or pressure. Various changes which will suggest themselves to those skilled in the art after becoming familiar with the invention may be made in the material configuration, details of construction and arrangement of the elements without departing from the invention, and reference is therefore made to the appended claims to ascertain the scope of the invention.

The invention claimed is:

1. In a transducer, the combination of:
    an annular piezoelectric element having a pair of coaxial cylindrical surfaces at radially spaced-apart positions, said piezoelectric element being electrically polarized in a direction parallel to its axis;
    a pair of mutually insulated electrodes in conductive contact with said two cylindrical surfaces of said piezoelectric element;
    first and second members secured respectively to inner and outer surfaces of said piezoelectric element; and
    means for moving one of said members relative to the other in a direction parallel to said axis whereby electric potentials are developed between said electrodes in accordance with the resultant shearing movement of said cylindrical surfaces of said piezoelectric element.

2. A transducer as defined in claim 1 wherein said piezoelectric element is composed of a plurality of concentric tubular piezoelectric members arranged one inside of another with adjacent cylindrical surfaces of adjacent tubular piezoelectric members firmly secured together and in which the axis of polarization of the respective members are alternately directed in opposite directions parallel to the axis of said cylindrical surfaces.

3. A transducer as defined in claim 1 in which said first member is a cylindrical element rigidly supported on a base and said second member is an annular inertia member.

4. A transducer as defined in claim 3 in which said inertial member is supported on said base member entirely by said piezoelectric element.

5. In a transducer, the combination of:
    an annular piezoelectric element having a pair of coaxial cylindrical surfaces at radially spaced-apart positions, said piezoelectric element being electrically polarized in a direction parallel to its axis;
    first and second members secured respectively to the inner and outer surfaces of said piezoelectric element;
    means for moving one of said members relative to the other in a direction parallel to said axis, whereby electric potentials are developed between said cylindrical surfaces in accordance with the relative shearing movement of said piezoelectric element in a direction parallel to said axis; and
    means electrically coupled to radially spaced-apart areas of said element for detecting changes in said electric potentials.

6. A transducer as defined in claim 5 wherein said piezoelectric element is composed of a plurality of concentric tubular piezoelectric members arranged one inside of another with adjacent cylindrical surfaces of adjacent tubular piezoelectric members firmly secured together and electrically coupled and in which the axes of polarization of the respective members are alternately directed in opposite directions parallel to the axis of said piezoelectric element, and wherein said electrically coupled means comprises electrodes disposed between adjacent surfaces of adjacent tubular piezoelectric members.

7. A transducer as defined in claim 6 in which said first member is a cylindrical element rigidly supported on a base and said second member is an annular inertia member.

8. In a transducer, the combination of:
    a support member extending along a predetermined axis, said support member having a cylindrical surface concentric with said predetermined axis;
    an annular piezoelectric element having a cylindrical surface contiguous with and secured to the cylindrical surface of said support member, said piezoelectric element being electrically polarized in a direction parallel to said predetermined axis;
    a second member concentrically secured to said piezoelectric element at a positioin radially spaced from said cylindrical surface;
    said two members being adapted to move relative to each other in a direction parallel to said predetermined axis, whereby a radially directed electric field is developed in said piezoelectric element in response to relative movement of said members in a direction parallel to said predetermined axis; and
    electrical means coupled to radially spaced-apart areas of said piezoelectric element for detecting changes in such radially directed electrical fields.

9. A transducer as defined in claim 8 in which said first member is a cylindrical element rigidly supported on a base and said second member is an annular inertia member.

10. An accelerometer comprising:
    a housing having a cavity therein, and having a support member extending into said cavity, said support member having a cylindrical surface parallel to a predetermined axis;
    a piezoelectric element encircling said support member and having a cylindrical surface contigious with and secured to the cylindrical surface of said support member, said piezoelectric element being electrically polarized in a direction parallel to said predetermined axis;
    an inertia member concentrically secured to said piezoelectric element at a position radially spaced from said cylindrical surface whereby a raidally directed electric potential is developed between opposed radially spaced-apart portions of said piezoelectric element in response to vibration of said housing in a direction parallel to said predetermined axis; and electrical means for detecting changes in such electric potential.

11. A transducer as defined in claim 2 comprising a voltage sensing circuit including two conductive elements,
the inner surface of alternate piezoelectric members being electrically connected to one of said elements and the inner surfaces of the other piezoelectric members being electrically connected to the other of said conductive elements,
each pair of adjacent cylindrical surfaces of said piezoelectric members being electrically connected to the same one of said conductive elements.

12. In a transducer, the combination of:
means including a cylindrical support member mountable on a vibrating object for detecting vibrations along an axis parallel to the axis of said cylindrical support member;
an annular piezoelectric element having a cylindrical surface secured to said cylindrical surface of said support member, said piezoelectric element being electrically polarized in the direction parallel to said axis whereby a radially directed electric field is developed in said piezoelectric elements in accordance with shearing movement of said cylindrical surface of said piezoelectric element relative to the outer surface of said piezoelectric element;
means including a pair of terminals electrically coupled to portions of said piezoelectric element at different radial distances from said axis for detecting changes in said electrical field caused by vibration of said support member along said axis.

13. In a transducer, the combination of:
means including a cylindrical support member mountable on a vibrating object for detecting vibrations along an axis parallel to the axis of said cylindrical support member;
an annular piezoelectric element having a cylindrical surface secured to the cylindrical surface of said support member, said piezoelectric element being electrically polarized in the direction parallel to said axis whereby a radially directed field is developed in said piezoelectric element in accordance with shearing movement of said cylindrical surface of said piezoelectric element relative to the outer surface of said piezoelectric element; and
means including a pair of terminals electrically coupled to radially spaced apart portions of said piezoelectric element for detecting changes in said electrical field caused by vibration of said support member along said axis.

14. In a transducer, the combination of:
a cylindrical support member;
an annular piezoelectric element having a cylindrical surface secured to the cylindrical surface of said support member, said piezoelectric element being electrically polarized in the direction parallel to the axes of said cylindrical surfaces, whereby a radially directed electric field is developed in said piezoelectric element in accordance with differential axial movement of two spaced apart cylindrical portions of said piezoelectric element in a direction parallel to said axis;
means for imparting differential axial movement to two coaxial spaced apart cylindrical portions of said piezoelectric element;
means including a pair of terminals electrically coupled to radially spaced apart portions of said piezoelectric element for detecting changes in said electrical field caused by such differential movement of such coaxial cylindrical portions of said piezoelectric element.

References Cited in the file of this patent

UNITED STATES PATENTS

| | | |
|---|---|---|
| 2,137,188 | Whitman | Nov. 15, 1938 |
| 2,488,586 | Diemer | Nov. 22, 1949 |
| 2,573,285 | Statham | Oct. 30, 1951 |
| 2,625,663 | Howatt | Jan. 13, 1953 |
| 2,639,210 | Robertson et al. | May 19, 1953 |
| 2,808,522 | Dranetz | Oct. 1, 1957 |
| 2,808,524 | Feinstein | Oct. 1, 1957 |
| 2,864,013 | Wood | Dec. 9, 1958 |

OTHER REFERENCES

Journal of the Acoustical Society of America, vol. 27, 1955, pages 728–729.